(12) United States Patent
Veno et al.

(10) Patent No.: US 7,905,341 B1
(45) Date of Patent: Mar. 15, 2011

(54) HANDLING SYSTEM FOR MULTIPLE WORKPIECES

(75) Inventors: Frank C. Veno, Columbus, OH (US); Visvaldas Joseph Grabauskas, Upper Arlington, OH (US)

(73) Assignee: Alpha 1 Induction Service Center, Inc., Columbus, OH (US)

( * ) Notice: Subject to any disclaimer, the term of this patent is extended or adjusted under 35 U.S.C. 154(b) by 0 days.

(21) Appl. No.: 12/122,777

(22) Filed: May 19, 2008

Related U.S. Application Data

(60) Provisional application No. 60/938,572, filed on May 17, 2007.

(51) Int. Cl.
    B65G 47/24 (2006.01)
    B65G 47/14 (2006.01)
    B65G 47/84 (2006.01)

(52) U.S. Cl. ............... 198/396; 198/383; 198/397.01; 198/397.06

(58) Field of Classification Search ............. 198/383, 198/396, 397.01, 397.06
    See application file for complete search history.

(56) References Cited

U.S. PATENT DOCUMENTS
5,634,547 A * 6/1997 Belanger et al. ......... 198/397.05

OTHER PUBLICATIONS

"Billet Step Feeder"; Alpha 1 Induction Bulletin MathndIng01, 2005; 1 page; Alpha 1 Induction Service Center, Inc.; Columbus, Ohio USA.

"α1 Billet and Preform Feeders"; Alpha 1 Induction Bulletin; circa 1998; 1 page; Alpha 1 Induction Service Center, Inc.; Columbus, Ohio USA.

"α Basic Billet Feeder"; Alpha 1 Induction Bulletin; circa 1998; 1 page; Alpha 1 Induction Service Center, Inc.; Columbus, Ohio USA.

"α Hydraulic Billet Feeder"; Alpha 1 Induction Bulletin; circa1998; 2 pages; Alpha 1 Induction Service Center, Inc.; Columbus, Ohio USA.

"α Motorized Billet Feeder"; Alpha 1 Induction Bulletin; circa1998; 2 pages; Alpha 1 Induction Service Center, Inc.; Columbus, Ohio USA.

"Alpha 1 Rotary Feeders"; Alpha 1 Induction Bulletin; 2006; 1 page; Alpha 1 Induction Service Center, Inc.; Columbus, Ohio USA.

* cited by examiner

*Primary Examiner* — Gene Crawford
*Assistant Examiner* — Yolanda Cumbess
(74) *Attorney, Agent, or Firm* — Philip O. Post

(57) ABSTRACT

A handling system for multiple workpieces is provided for repeatedly lifting rows of multiple workpieces on a lift assembly from a collection of workpieces in a hopper and selectively delivering one or more rows of orientated workpieces to an exit conveyor. Any disoriented workpieces on the exit conveyor can be discarded from the exit conveyor and returned to the collection of workpieces in the hopper.

2 Claims, 11 Drawing Sheets

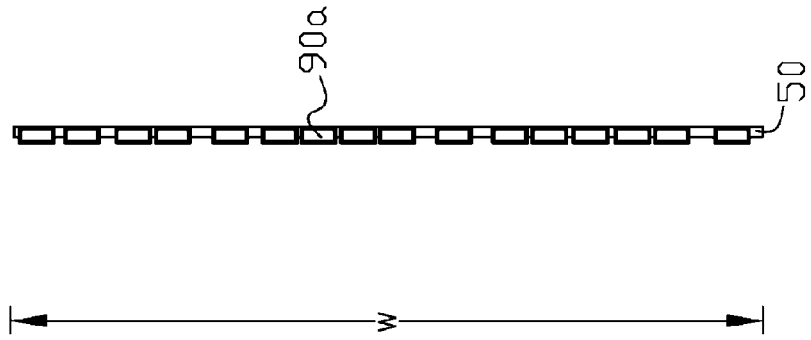
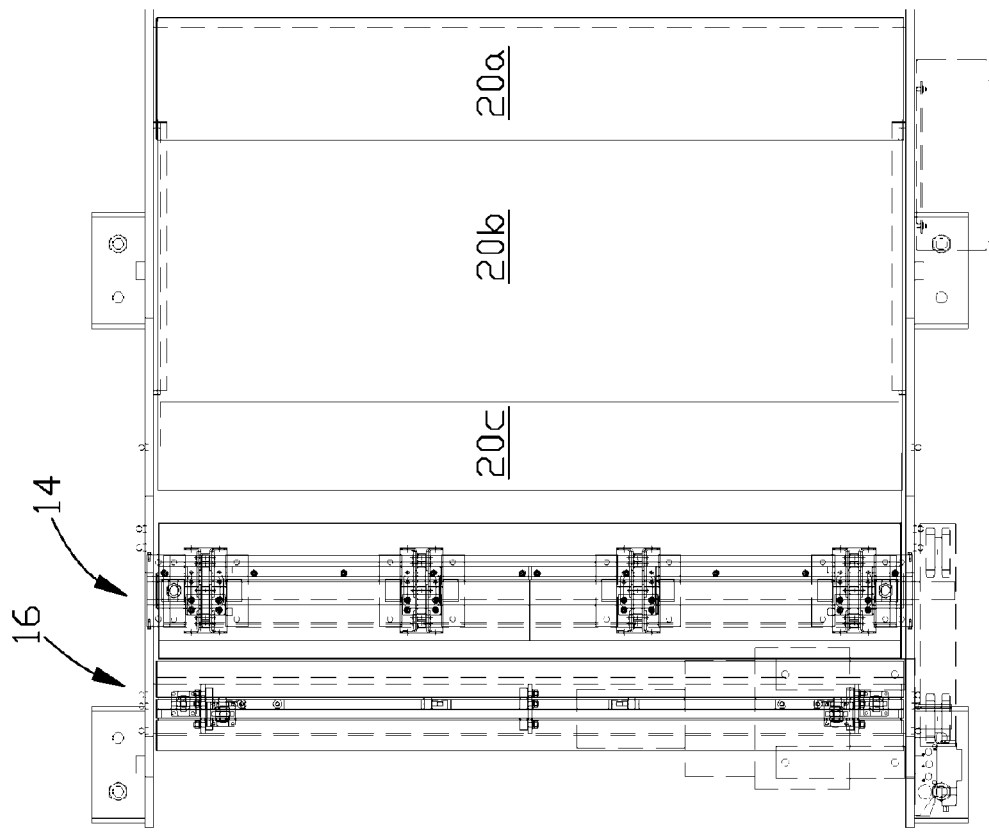

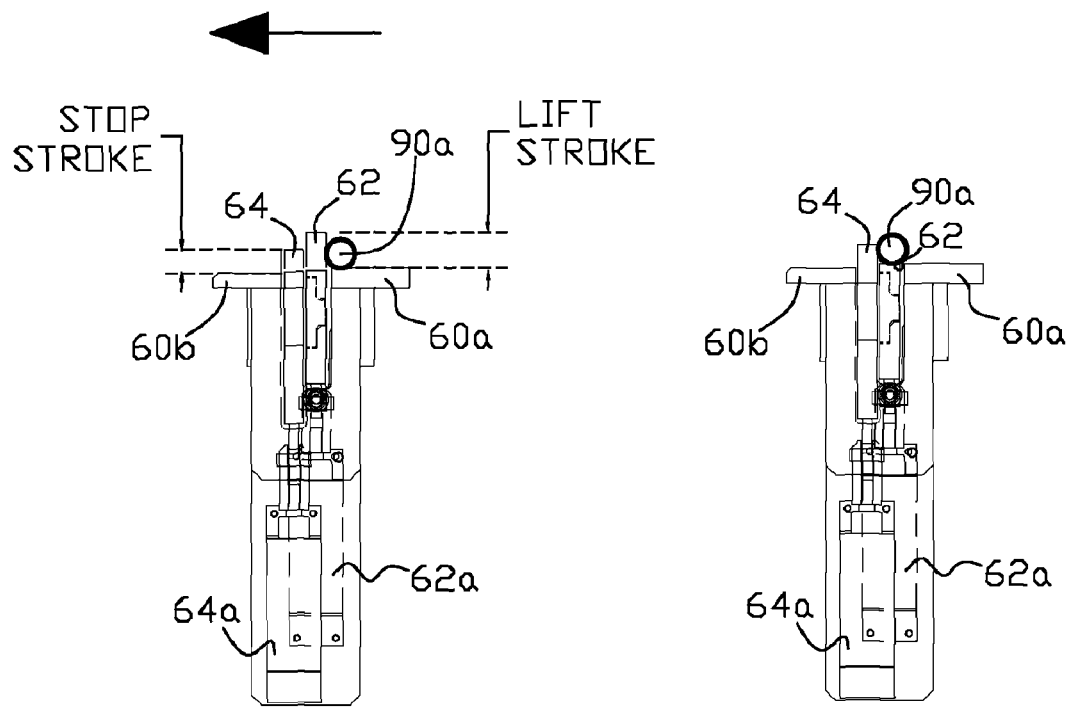
FIG. 9(a)
FIG. 9(b)
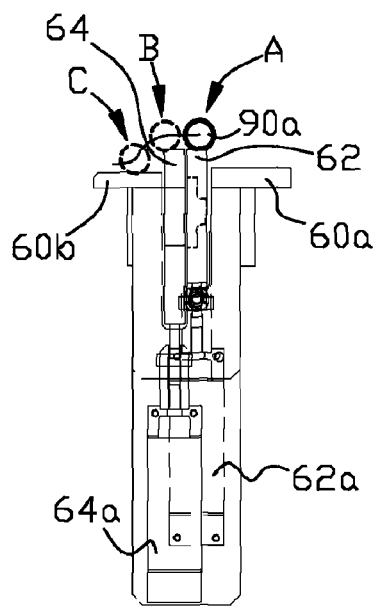
FIG. 9(c)

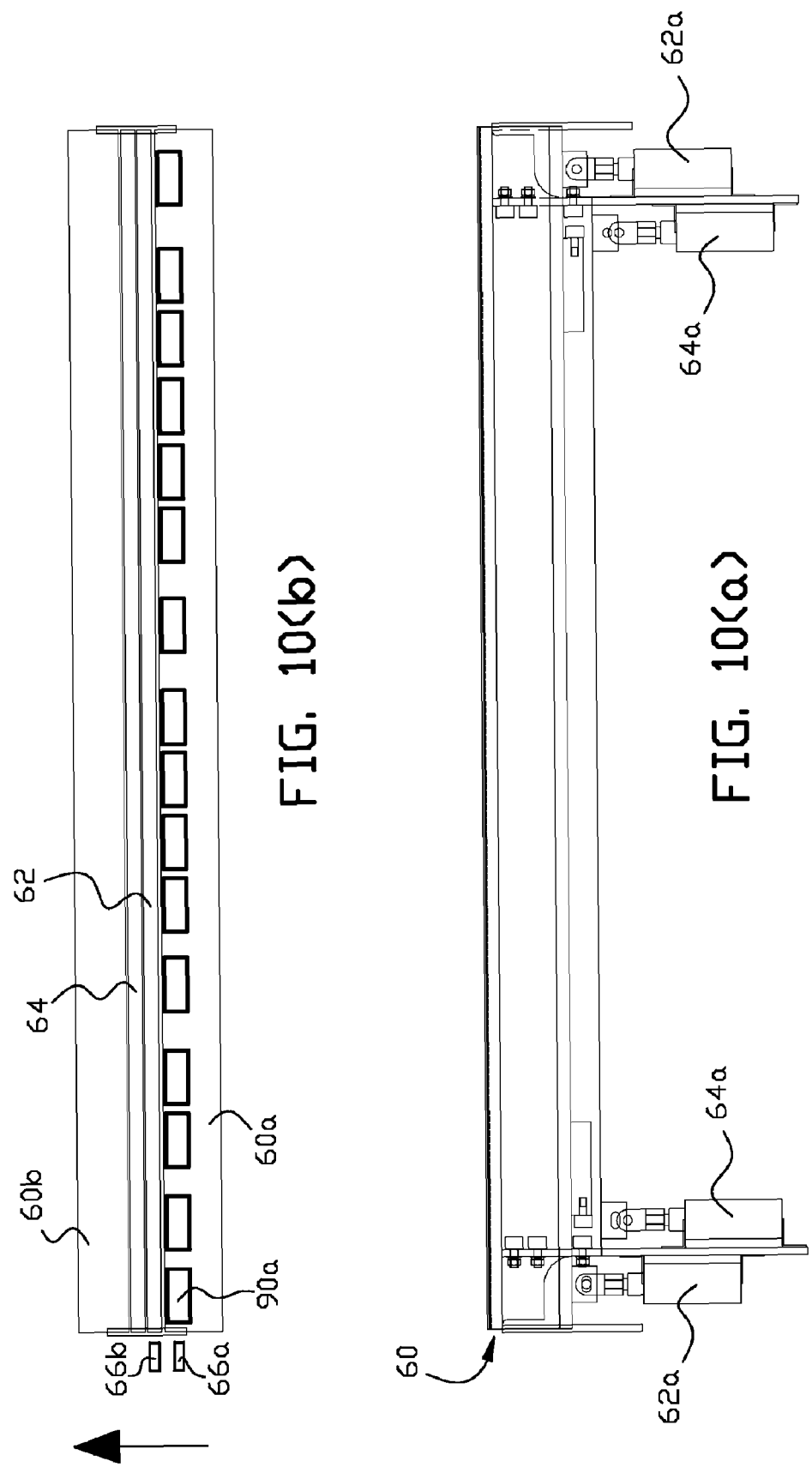

7,905,341 B1

HANDLING SYSTEM FOR MULTIPLE WORKPIECES

CROSS REFERENCE TO RELATED APPLICATIONS

This application claims the benefit of U.S. Provisional Application No. 60/938,572, filed May 17, 2007, hereby incorporated by reference in its entirety.

FIELD OF THE INVENTION

The present invention relates to a handling system for multiple workpieces, for example, metal billets, that sorts multiple workpieces from a collection of workpieces and orients them for delivery from the handling system.

BACKGROUND OF THE INVENTION

In an industrial process, for example a continuous forging operation, workpieces must be continuously feed to the forging apparatus. Each workpiece may be a metal billet that is, for example, cylindrically shaped. Workpieces, also referred to as a slugs or blanks, may be cut from a long length of feedstock. Typically the cutting operation is not integrated into the forging production line. For example the feedstock cutting apparatus may deposit the cut workpieces into a collecting container. The workpieces then need to be picked from the container, properly oriented and fed to the forging apparatus. These steps may be manually performed. There are also workpiece step feeders that lift a row of billets on a step or ledge from a collection of billets at the bottom of a bin and deliver them to a conveyor for transport to forging apparatus. Disadvantages of a step feeder is that a step or ledge does not generally pick up a highly populated row of workpieces, and the quantity of workpieces that are disoriented as they seat upon a step is relatively high. Therefore the number of properly oriented billets that exit from a step feeder in a given period of time is less than an optimum delivery rate.

One object of the present invention is to provide an automated handling system for multiple workpieces that will deliver properly oriented workpieces with an improved rate of delivery.

BRIEF SUMMARY OF THE INVENTION

In one aspect the present invention is an apparatus and method for handling a collection of disoriented workpieces deposited in a hopper of the apparatus. A multiple workpiece lift assembly located in the hopper sequentially loads a row of workpieces onto one of a plurality of lift shelf assemblies that carries the row of workpieces over the top of the lift assembly where the lift shelf assembly guides each row of oriented workpieces off of the lift shelf assembly and onto a sorter where a lift gate and stop gate control movement of each row of oriented workpieces to an exit conveyor. An optional disoriented workpiece rejecting mechanism may be provided to remove disoriented workpieces on the exit conveyor and return them to the collection of workpieces in the hopper.

The above and other aspects of the invention are set forth in this specification and the attached claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings:

FIG. 4(a) is a top view of selected features of the handling apparatus of the present invention shown in FIG. 2, and FIG. 4(b) is a top view of a row of workpieces seated along the width of a shelf attached to the multiple workpiece lift assembly used in the present invention.

FIG. 9(a) is a partial side cross sectional elevation of one example of a sorter used with the handling apparatus of the present invention.

FIG. 9(b) illustrates a row of workpieces seated on the lift bar of the sorter and FIG. 9(c) illustrates a row of workpieces on a raised lift bar moving over the stop bar of the sorter and onto the departure plate area of the sorter.

FIG. 10(a) is a front elevation view and FIG. 10(b) is a top view of one example of a sorter used with the handling apparatus of the present invention.

DETAILED DESCRIPTION OF THE INVENTION

Figure 1A:
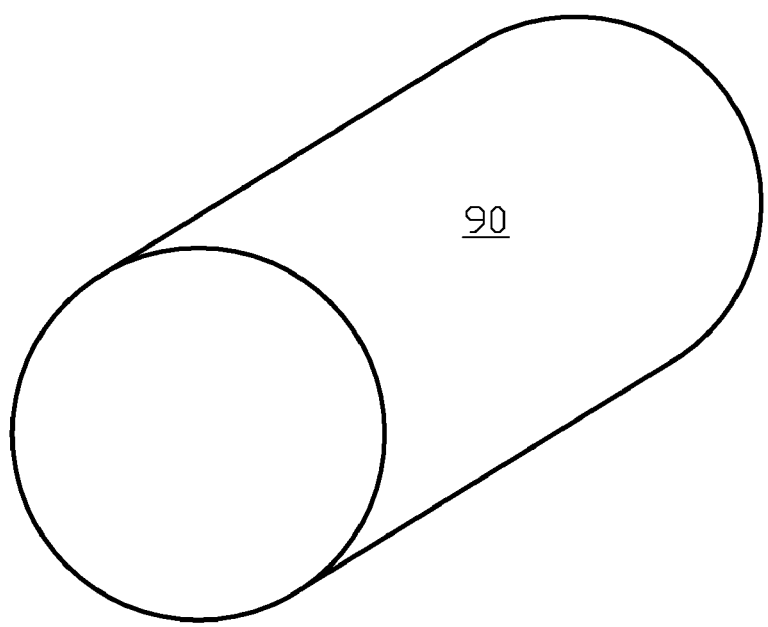
FIG. 1(a) and FIG. 1(b) illustrate in perspective and cross section, respectively, two examples of typical workpieces handled by the handling system of the present invention.
Figure 1B:
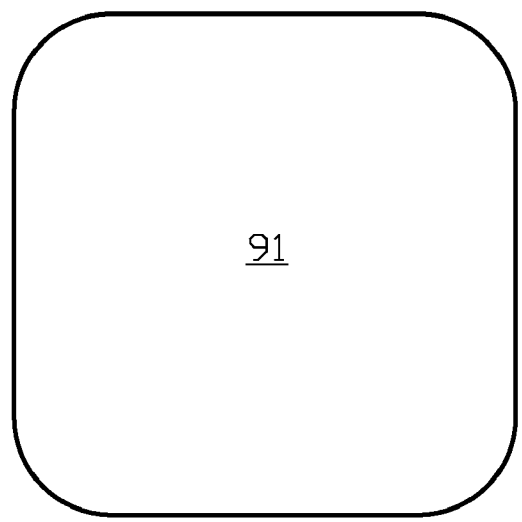
Figure 2:
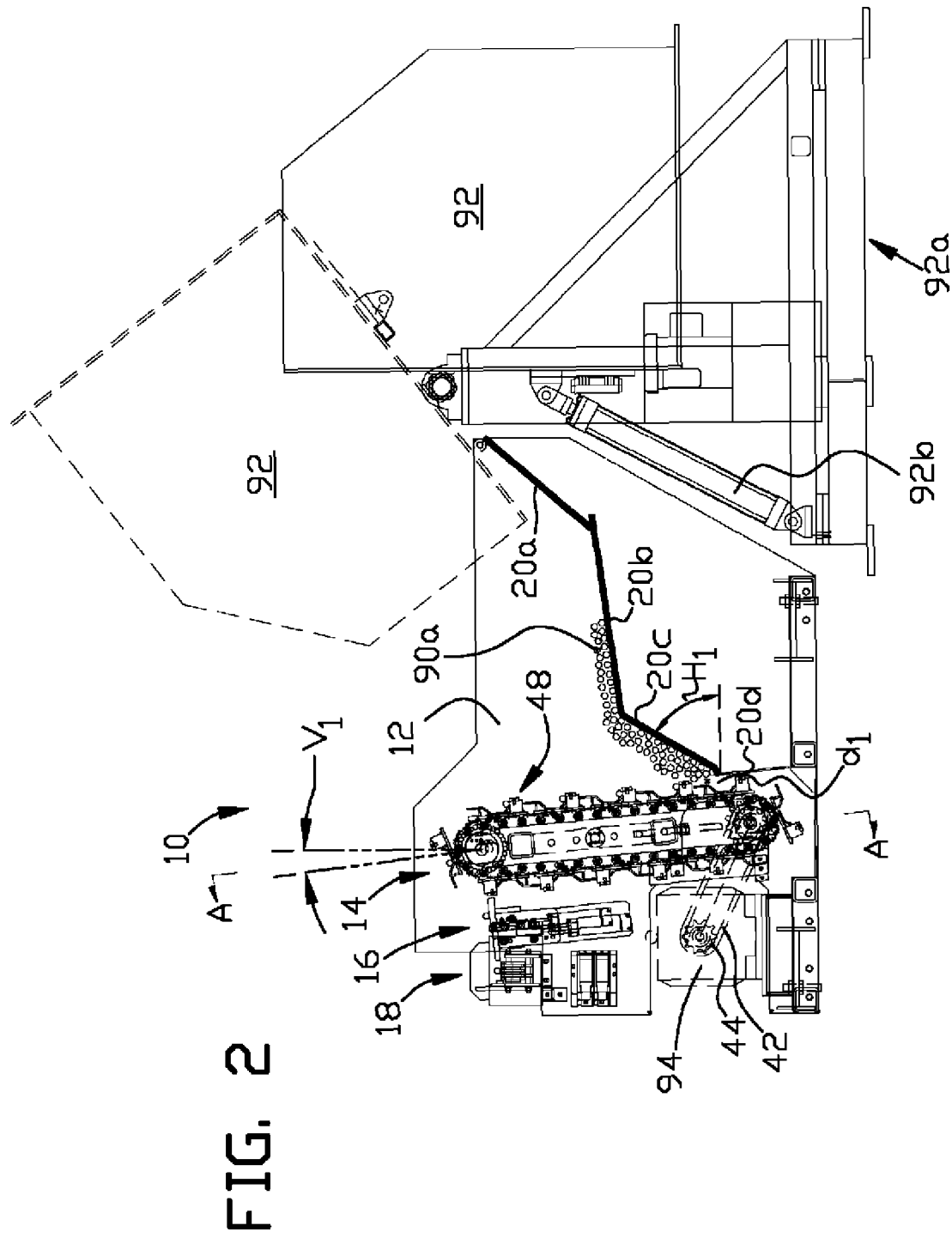
FIG. 2 illustrates in cross sectional elevation one example of a handling apparatus of the present invention and a moveable container, with associated components, that could be used to deliver workpieces to the handling apparatus.
Figure 3:
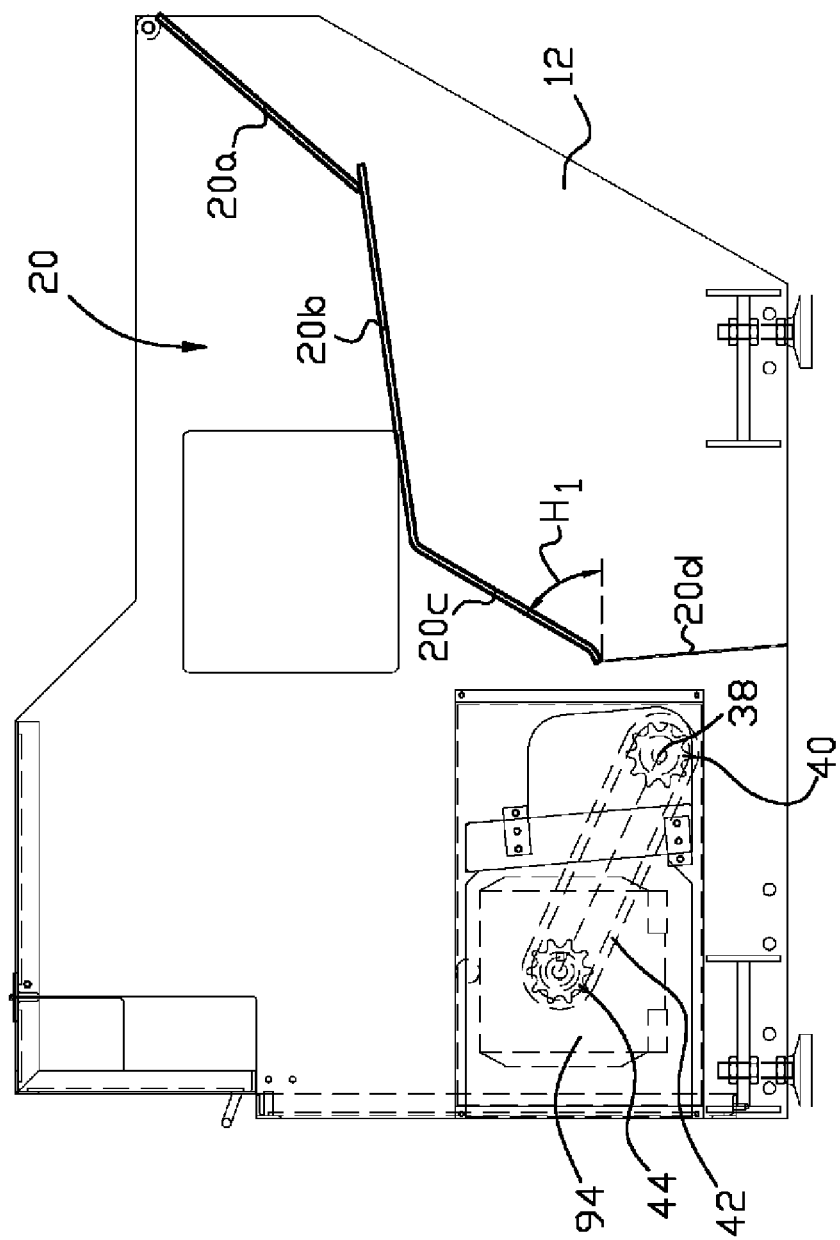
FIG. 3 illustrates in cross sectional elevation selected features of the handling apparatus of the present invention shown in FIG. 2.

There is shown in the drawings one example of the handling system 10 for multiple workpieces of the present invention. The apparatus comprises hopper 12, multiple workpiece lift assembly 14, sorter 16 and exit conveyor 18. Workpieces may be of any shape, for example, a cylindrically shaped workpiece 90 as shown in perspective in FIG. 1(a) or a rectangularly shaped workpiece 91, with fillet corners, as shown in cross section in FIG. 1(b). The workpieces may be metal alloy billets that are used in a forging process. Multiple workpieces can be delivered in bulk to handling system 10 by moveable container 92. In FIG. 2 the moveable container is shown in horizontal position (solid lines) and rotated dump position (dashed lines). Container 92 is attached to support structure 92a, and can be rotated from the horizontal position to the dump position by a suitable mechanical actuator, such as one or more powered hydraulic cylinders 92b, so that workpieces can be deposited in the hopper. Other methods may be used for depositing workpieces in the hopper; for example, the hopper may be positioned adjacent to the cutting apparatus that cuts workpieces from long lengths of feedstock so that each workpiece moves directly into the hopper after being cut from the feedstock.

Hopper 12 comprises downward ramp assembly 20 that directs the workpieces from the top of the hopper towards the bottom of the hopper adjacent to one side of multiple workpiece lift assembly 14, which is designated the workpiece "pickup area," so that when one of the lift's shelves 50 passes the pickup area, multiple workpieces are loaded onto the shelf in rows as further described below. In this non-limiting example, the ramp assembly comprises ramp sections 20a, 20b and 20c. Optional structural element 20d may be provided to assist in preventing workpieces, or other objects, from falling to the bottom of the hopper in the space between lowest ramp section 20c and the workpiece lift assembly. The ramp sections may comprise stationary structures, or moving structures, such as a mechanically driven conveyor belt, or a combination of stationary and moving structures. Further the ramp sections may have textured, such as grooved, surfaces to assist in directing the workpieces to the pickup area. Preferably ramp section 20c has a steep horizontal angle $H_1$, typically 60 degrees or greater, to assist in directing workpieces onto each shelf as a shelf passes by the pickup area as further described below.

The multiple workpiece lift assembly 14, or carousel, comprises a lift drive assembly and a plurality of multiple workpiece lift shelf assemblies 48 that are attached to the lift drive assembly. Multiple workpieces are seated on shelf 50 of each of the workpiece lift shelf assemblies and raised from a lower region of the hopper as further described below. In this non-limiting example, as best seen in FIG. 6, twelve shelf assembles 48 are rotatably mounted to the lift assembly 14; the number of shelf assemblies may vary depending upon a particular application.

Figure 5:
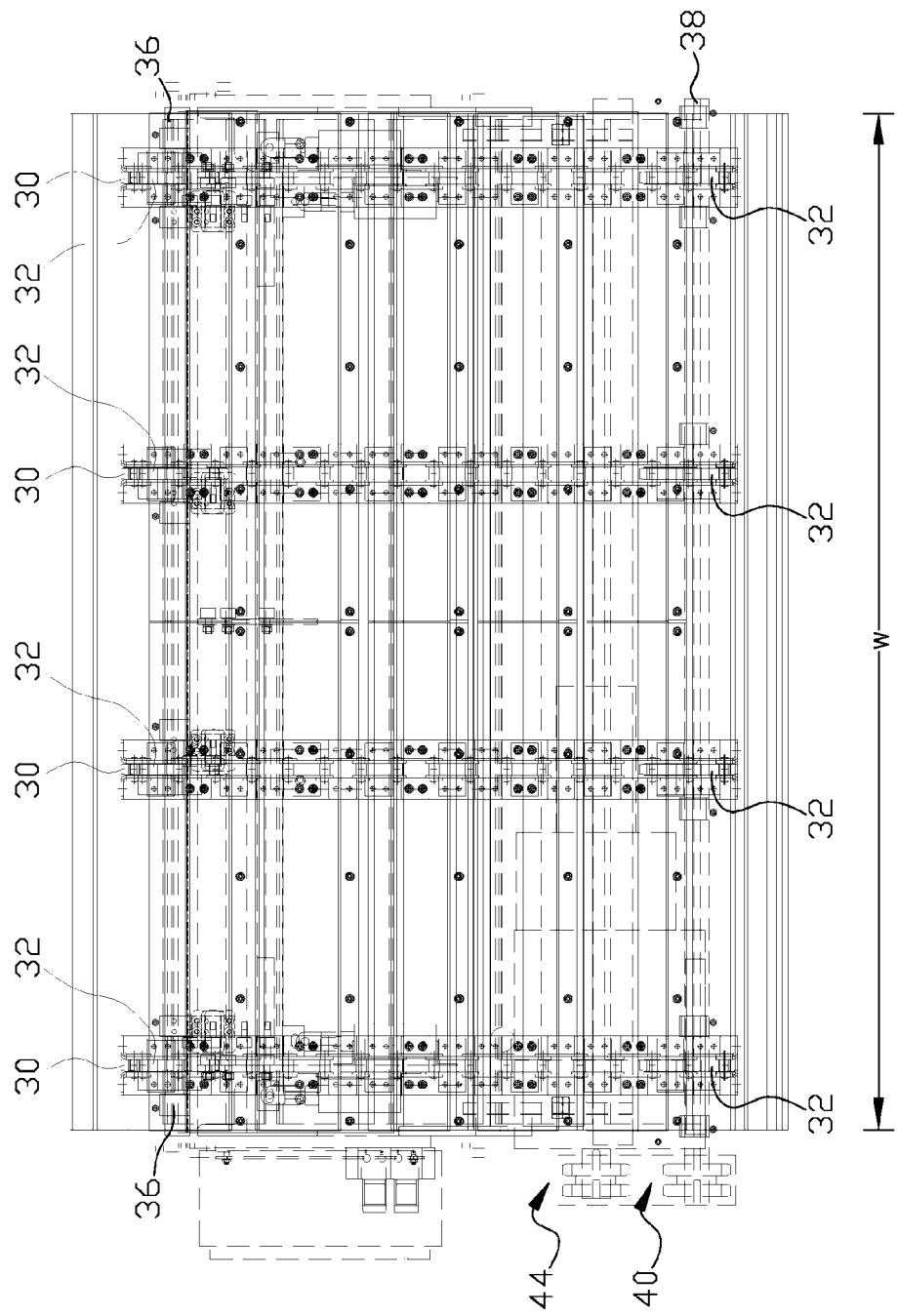
FIG. 5 is a cross section elevation view through line A-A in FIG. 2 of the multiple workpiece lift assembly used with the handling apparatus of the present invention.
Figure 6:
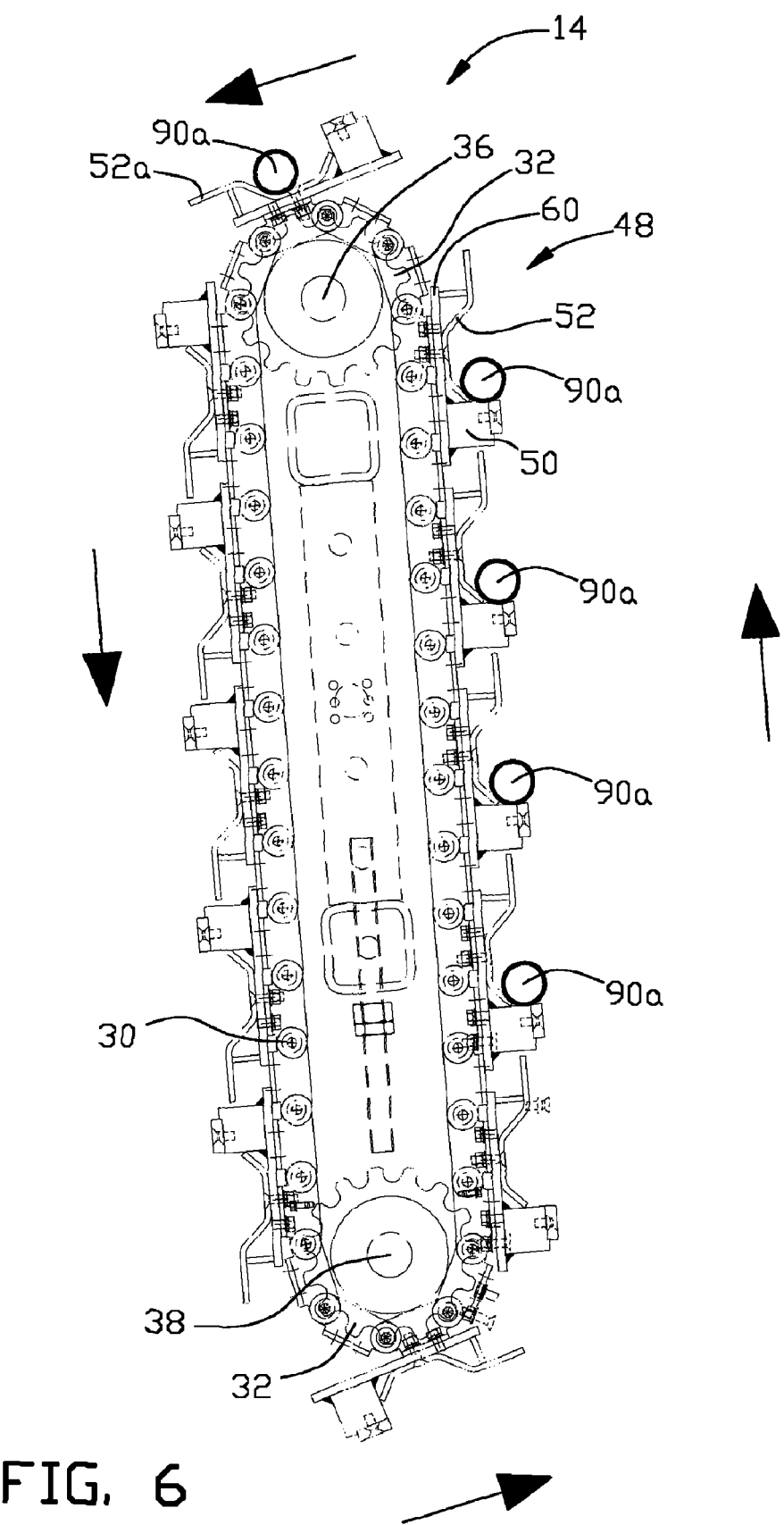
FIG. 6 is a side elevation view of one example of a multiple workpiece lift assembly used in the handling apparatus of the present invention shown in FIG. 2.

In this non-limiting example of the invention, the lift drive assembly includes a plurality of lift roller chains 30 that are driven in the counterclockwise direction as indicated by the arrows in FIG. 6 by sprockets 32. The sprockets are held in place with bearing blocks 34 suitably supported by the multiple workpiece lift assembly. The bearing blocks support shafts 36 and 38. In this non-limiting example of the invention, shaft 38 is driven with shaft drive sprocket 40, through chain 42 and driver sprocket 44. Driver sprocket 44 is connected to a suitable drive mechanism, for example, electric motor 94, with the output shaft of the motor mechanically connected to driver sprocket 44 via a gear reducer (not shown in the drawings). A braking mechanism may be provided to stop and hold lift roller chains 30 in place when the output of the drive mechanism is not powered. In operation the lift drive may operate continuously or in an index mode wherein, for example, the lift drive pauses when a row of workpieces is loaded onto a lift shelf assembly and/or the lift drive releases a row of workpieces from a lift shelf assembly. The drive mechanism may have a variable speed output to change the velocity of the lift roller chains and the attached multiple workpiece lift shelf assemblies 48. Suitable sensing means may be provided, for example, to sense workpiece jamming of the lift drive; control means may be provided to jog the lift drive between forward and reverse directions to automatically clear the jam without intervention by a human operator. As shown in the figures, for example FIG. 5, in this non-limiting example of the invention, four lift (carrier) roller chains 30 and eight sprockets 32 are used across the width, w, of the multiple workpiece lift assembly; the number of chains and sprockets may vary depending upon a particular application.

Figures 7A, 7C:
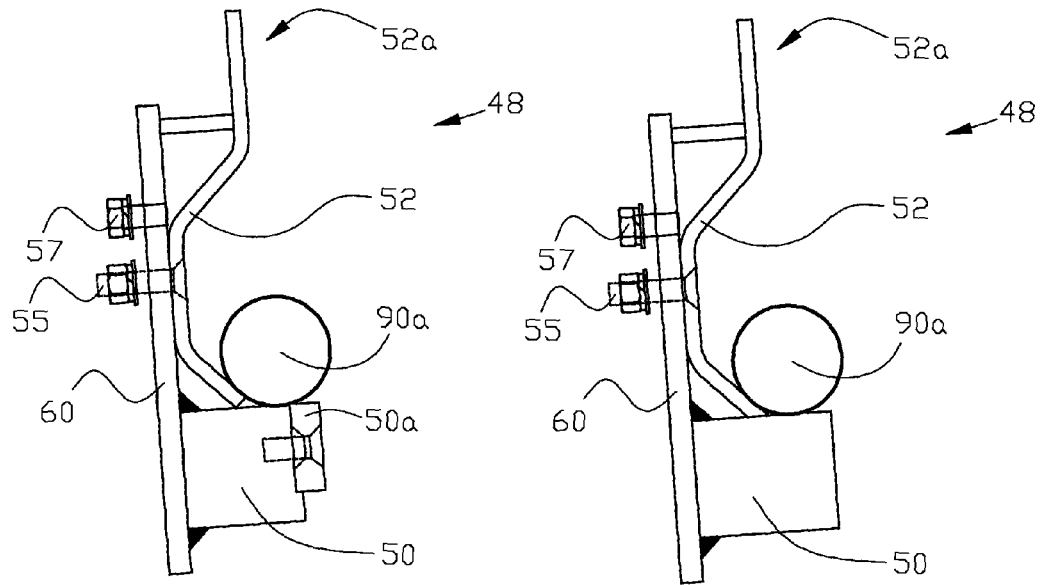
FIG. 7(a) is a side elevation view of one example of a multiple workpiece lift shelf assembly used with the multiple workpiece lift assembly shown in FIG. 6.
FIG. 7(c) is a side elevation view of another example of a multiple workpiece lift shelf assembly used with the multiple workpiece lift assembly shown in FIG. 6.

Referring to FIGS. 7(a) and 7(c) each multiple workpiece lift shelf assembly 48 comprises shelf 50 and backplane 52. An optional flight nose 50a may be provided. Each shelf and backplane extends for the width, w, of multiple workpiece lift assembly 14. Multiple workpieces are seated on shelf 50 in a row as the lift drive assembly moves each of the shelf assemblies past the workpiece pickup area that is described above, then lifts the workpieces on the shelf assembly to the top of the multiple workpiece lift assembly, and releases the workpieces from the shelf assembly as the shelf assembly passes over the top of the lift assembly. The number of workpieces seated in a row on a lift shelf assembly will vary depending upon the relative length of the workpieces and the width of the lift shelf. Preferably a shelf is fully populated, however some shelves may have only one or more workpieces seated on a shelf due to the mixed orientation of workpieces in the hopper. Backplane 52 is shaped to help retain the multiple workpieces on a shelf during the lift, and guide the workpieces off of the shelf assembly as further described below. The open ended scooped shape of backplane 52 shown in the figures is preferred since it permits a wide range of workpieces with varying cross sectional diameters to be seated and lifted in the shelf assembly, and also assists in providing a controlled roll off of the workpieces from the shelf assembly as further described below. Optional flight nose 50a may be provided to assist in retaining workpieces in the shelf assembly when the lift assembly moves, and may have an upper surface that is raised above the upper surface of shelf 50. The shelf and backplane are attached to mounting structure 60, which in turn, is attached to lift roller chains 30, for example, by fasteners 55 and 57. Location of the fasteners determines the pivot point of a shelf assembly relative to the connected lift roller chains. Preferably the distance, $d_1$, (FIG. 2) between lower ramp section 20c and a passing multiple workpiece lift shelf assembly 48 is kept to a minimum to prevent workpieces from falling to the bottom of the hopper. Preferably the multiple workpiece lift assembly 14 is tilted to a suitable angle, V, from vertical to assist in keeping the workpieces on a shelf as the shelf rises and moves upward and away from lower ramp section 20c. In other examples of the invention, the multiple workpiece lift assembly 14 may be pivotally mounted so that the angle, V, can be changed depending on the dimensions of the particular workpieces being lifted on the shelves. The shelves are preferably formed from a hardened steel, such as a heat treated high carbon steel, to enhance service life. Multiple workpiece lift assembly 14 may be modular to facilitate removal from the hopper and replacement. The number of components making up the multiple workpiece lift assembly may change depending upon a particular application. For example the number of components may change to alter the overall length of the lift assembly to accommodate a change in the distance through which workpieces are elevated.

In other examples of the invention optional adjustable and removable stops may be affixed to each backplane 52 of the plurality of multiple workpiece lift shelf assemblies 48. The stops may be positioned substantially perpendicular to each shelf 50 to prevent a shelf from over filling with workpieces. The stops may be removed to accommodate the size of workpieces for a particular application.

Figure 7B:
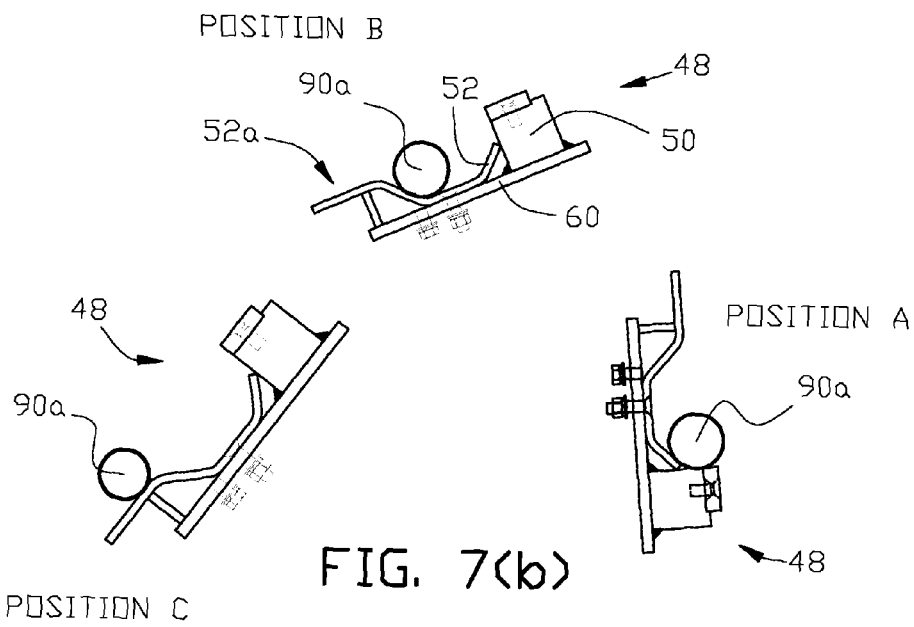
FIG. 7(b) illustrates movement of a row of workpieces seated on the shelf of a multiple workpiece lift shelf assembly as the shelf assembly is rotated over the top of the multiple workpiece lift assembly.
Figure 8:
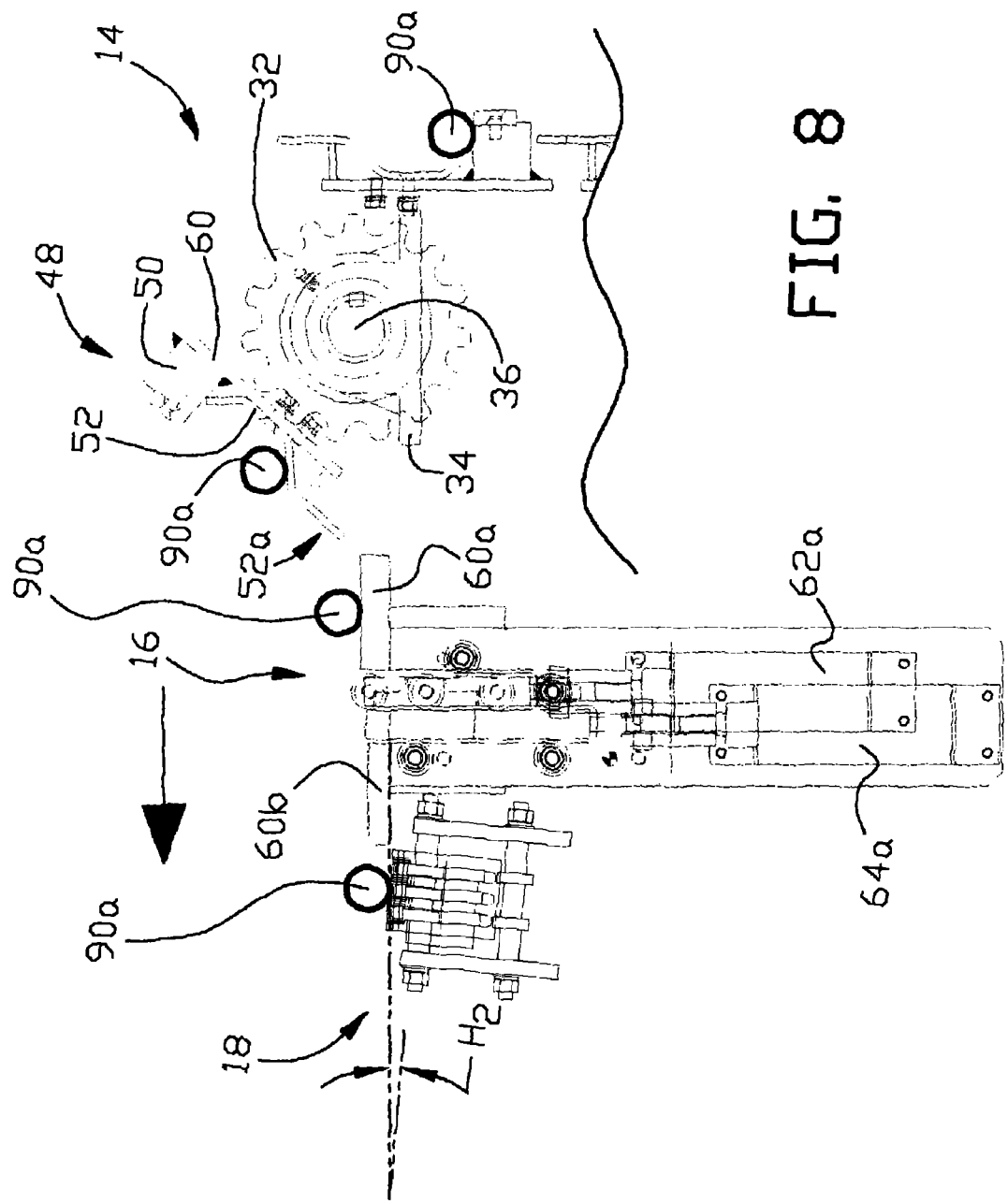
FIG. 8 is a partial cross sectional elevation illustrating one example of the multiple workpiece lift assembly, sorter and exit conveyor of the handling apparatus of the present invention with rows of workpieces moving from the lift assembly to the sorter and exit conveyor.

A row of workpieces sitting on one of the shelves 50 are lifted out of hopper 12 as the lift roller chains 30 rotate as described above. When the shelf rotates over the top or apex of the multiple workpiece lift assembly 14 and about a pivot point of attachment to the roller chains, the row of workpieces on the shelf are guided by gravity off of the shelf and over leading end 52a of backplane 52 for release from the lift drive assembly. In some examples of the invention the released row of workpieces may be deposited directly into a receiving container for further processing. In other examples of the invention where sorter 16 is used, the row of workpieces on the shelf are guided by gravity off of the shelf and over leading end 52a of backplane 52 for release from the lift drive assembly to the workpiece row arrival plate area 60a of sorter plate 60 on sorter 16, where sorter plate 60 comprises arrival plate area 60a and departure plate area 60(b). This is illustrated for workpieces 90a, which is one of the workpieces in each row of workpieces, as best seen in FIG. 7(b) and FIG. 8. FIG. 7(b) illustrates a single lift shelf assembly 48 in three different positions: POSITION A (before the shelf assembly reaches the apex of the lift drive assembly); POSITION B (shortly after the shelf assembly passes the apex of the lift drive assembly and pivots); and POSITION C (shortly before release of the row of workpieces from the lift shelf assembly). As shown in FIG. 7(b) workpieces 90a on the lift shelf assembly move from their seated positions on shelf 50, through the scooped region of backplane 52, and then over the leading end 52a of the backplane as the shelf assembly transitions from POSITION A, B and C. Referring to FIG. 8, sorter plate 60 is titled from horizontal at an angle, $H_2$, and/or has workpiece row departure plate area 60b at a lower horizontal level than arrival plate area 60a as shown in FIG. 9(a), FIG. 9(b) and FIG. 9(c) to provide gravity movement of workpieces on the sorter plate in the direction indicated by the arrow in FIG. 8 and FIG. 9(a). Sorter 16 includes lift bar 62 and stop bar 64. The lift bar and stop bar are connected to independent driver mechanisms, such as powered hydraulic or pneumatic cylinders 62a and 64a, respectively, that selectively raise and lower the lift and stop bars. In the raised position (i.e. top of the lift gate above the horizontal plane of sorter plate 60) lift bar 62 stops further movement of a row of workpieces in the direction of the arrow in FIG. 9(a). In the lowered position (i.e. top of the lift gate at least level with, or below, the horizontal plane of sorter plate 60), a row of workpieces, if stopped by the lift bar, will move over the top of the lift bar and be stopped from further movement by a raised stop bar (FIG. 9(b)). Moving the stop bar to the lowered position, and/or raising the lift bar, allows a row of workpieces sitting on top of the lift bar to move over to the workpiece row departure plate area 60b of sorter plate 60 and onto exit conveyer 70. By coordinated raising and lowering of the lift and stop bars, one row of workpieces can be controllably transferred to the exit conveyor in a controlled manner. In one non-limiting mode of operation the height of the stop bar is kept constant while the lift bar rises to lift a row of workpieces sitting on top of the lift bar over the raised stop bar. FIG. 9(c) illustrates a raised lift bar and the transition of workpiece 90a from positions A, B and C. The stop bar may also be adjusted in height depending upon the dimensions of the workpieces passing through the sorter.

In one example of the invention when a row of workpieces arrive at workpiece row arrival plate area 60a with lift bar 62 raised, a suitable first object presence sensor 66a, such as photoelectric beam sensor, may be used to transmit a signal to a processor that a row of workpieces has arrived at the workpiece row arrival plate area. The processor, at the appropriate time, can send a "lower lift bar" signal to a control device that causes the lift bar to lower so that the row of workpieces will come to rest on top of the lift bar while stop bar 64 is raised. A suitable second object presence sensor 66b may be used to transmit a signal to the processor that a row of workpieces is available on top of the lift bar. The processor may send an appropriate signal to control devices that cause the lift bar to rise and the stop bar to lower so that the row of workpieces on top of the lift bar moves over the stop bar and onto exit conveyor 18. As shown in FIG. 9(a) stop bar 64 generally has a lower maximum rise stroke than that of lift bar 62. The lift and stop bars can be optionally fitted with bearing cam followers to support and guide movement of the bars while decreasing wear of the bars.

If the row of workpieces do not have to be singled out and sorted by rows, both the lift bar and stop bar can be simultaneously lowered and all workpieces at the workpiece row arrival plate area 60a of sorter 60 will move to exit conveyor 18. Exit conveyor 18 may be of a continuous chain link design where workpieces sit on top of the chain links and are conveyed off of handling system 10 of the present invention. The chain link can be driven by a suitable sprocket drive system.

Figure 11A:
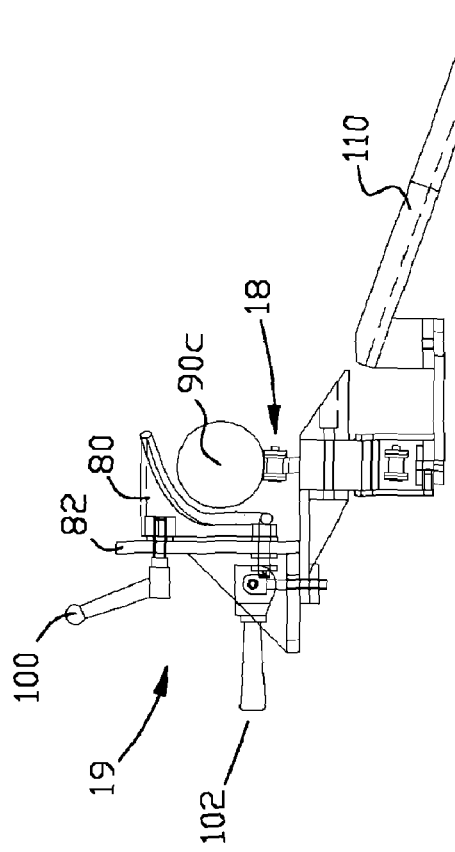
FIG. 11(a) is a side elevation of one example of a disoriented workpiece rejecting mechanism that can be used with an exit conveyor forming a part of the handling apparatus of the present invention.

Depending upon the dimensions of the workpieces, one or more workpieces may become disoriented, for example, stand on their ends as they travel through handling apparatus 10. Disorientation may occur, for example, as the workpieces move off of a multiple workpiece lift shelf assembly 48; move through the sorter's workpiece row arrival plate area; are lifted by lift bar 62; move over stop bar 64; or move onto exit conveyor 18. To ensure that all workpieces are properly oriented on exit conveyor 18, apparatus 10 may be optionally provided with disoriented workpiece rejecting mechanism 19 as shown in FIG. 11(a) through FIG. 11(d). Rejecting mechanism 19 is installed transversely across the path of the exit conveyor 18 as shown in FIG. 11(a). For substantially round workpieces, rejecting mechanism 19 utilizes arm 80 with an adjustable compound radius, which is suitable for cylindrically shaped workpieces. The shape of the arm may vary depending upon the shape of the workpieces. One end of the arm is positioned lower than the lowest point of the workpieces on the exit conveyor to ensure that a workpiece can not get under the conveyor and jam against the exit conveyor. Arm 80 may be formed from a hardened round bar and connected to support structure 82 in a manner that allows the arm to be rotatably adjusted into various positions. First end 80a of arm 80 is kept lower than the bottom plane of the workpiece resting on the exit conveyor. Arm 80 is made with a sweeping arc that has a hardened radius surface for contact with a disoriented workpiece. The arm is adjustable in vertical height to compensate for different diameters of workpieces. The leading lower edge of the arm is mounted to a support structure, such as metal plate 82 by means of a pivot pin 83 with washers 84 and spring 86, and the spring is held compressed with cotter key 88. This permits the arm's sweeping arc to rotate about the pivot pin. On the other end of the arm's sweeping arc is adjustment device 100, which allows the arm to be moved though a radius arc cutout 81 on plate 82. Securing devices 102 are provided to allow adjustable location of the arm relative to the exit conveyor in the horizontal direction. Arm 80 is locked and unlocked in a selected position with securing device 100. If a workpiece is disoriented on exit conveyor 18, it will come in contact with arm 80, rather than pass under the arm, as it travels on the exit conveyor, and will be sweep off of the exit conveyor 18. Chute 110 may be positioned to direct the path that the disoriented workpiece takes as it is swept off of the exit conveyor.

Figure 12:
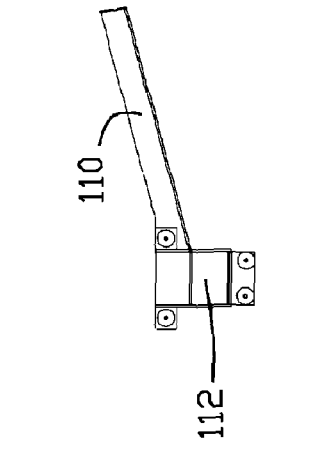
FIG. 12 is an elevation view of a disoriented workpiece return chute and pocket for return of a workpiece rejected by the disoriented workpiece rejecting mechanism.
Figure 11C:
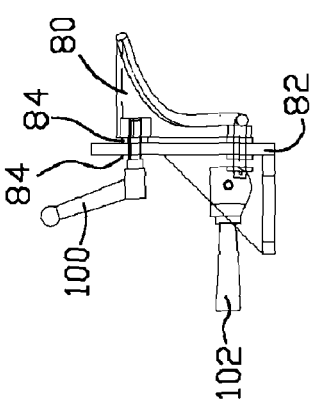
FIG. 11(c) is a side elevation view.
Figure 11D:
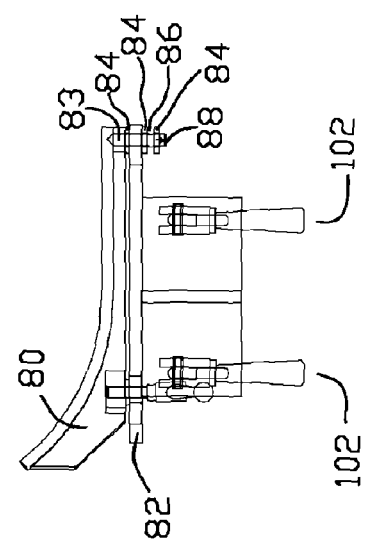
FIG. 11(d) is a top view of the disoriented workpiece rejecting mechanism shown in FIG. 11(a).
Figure 11B:
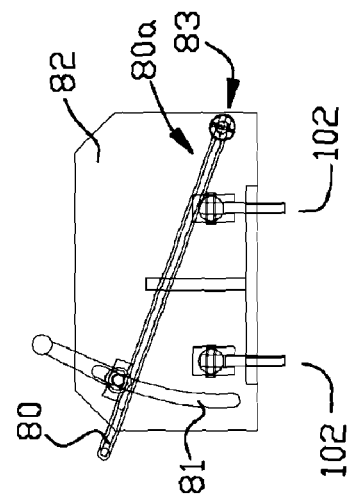
FIG. 11(b) is a front elevation view.

Optionally, as shown in FIG. 12, chute 110 may be connected directly or indirectly to an external side of the hopper so that the disoriented workpiece drops to return pocket 112, which opens into the hopper so that the workpiece is returned to the collection of workpieces on ramp assembly 20 for lifting out of the hopper by multiple workpiece lift assembly 14 as described above. In other examples of the invention the return chute may be located inside of the hopper.

Further modifications of the above examples of the invention, and alternative examples of the invention will be apparent to those skilled in the art in view of above disclosure and drawings of the invention. Therefore the above description of the invention is illustrative and is for the purpose of teaching those skilled in the art the method of carrying out the invention. The forms of the invention shown and described herein are presently preferred embodiments. Elements and materials may be substituted for those illustrated and described herein; parts and any processes may be reversed or modified, and certain features of the invention may be utilized independently, as would be apparent to one skilled in the art after having the benefit of this description of the invention and the appended claims.

The invention claimed is:

1. A handling system for sorting and orienting a plurality of workpieces, the handling system comprising:
    a hopper for holding the plurality of workpieces;
    a workpiece lift assembly extending into the hopper, the workpiece lift assembly having a plurality of workpiece lift shelf assemblies rotating sequentially about the workpiece lift assembly, each of the plurality of workpiece lift shelf assemblies comprising a shelf and a backplane for seating a row of workpieces from the hopper on the shelf and lifting the seated row of workpieces out of the hopper, each of the plurality of workpiece lift shelf assemblies pivotally attached to the rotating lift assembly for releasing the seated row of workpieces from each of the workpiece lift shelf assemblies as each of the workpiece lift shelf assemblies rotates over the apex of the workpiece lift assembly;
    a sorter for receiving the released row of workpieces, the sorter comprising:
        an arrival plate area for receiving the released row of workpieces; and
        a departure plate area, the arrival plate area separated from the departure plate area by a lift bar and a stop bar, the lift bar controllably rising to lift the released row of workpieces from the arrival plate area over the stop bar to the departure plate area;
    a first sensor to sense the presence of the released row of workpieces adjacent to the lift bar in the arrival plate area;
    a first drive mechanism to lower the lift bar responsive to the released row of workpieces adjacent to the lift bar to move the released row of workpieces on top of the lift bar; and
    a second sensor to sense the presence of the released row of workpieces on top of the lift bar, the first drive mechanism to raise the lift bar so that the released row of workpieces on top of the lift bar move to the departure plate area and onto an exit conveyor adjacent to the departure plate area.

2. A handling system for sorting and orienting a plurality of workpieces, the handling system comprising:
    a hopper for holding the plurality of workpieces;
    a workpiece lift assembly extending into the hopper, the workpiece lift assembly having a plurality of workpiece lift shelf assemblies rotating sequentially about the workpiece lift assembly, each of the plurality of workpiece lift shelf assemblies comprising a shelf and a backplane for seating a row of workpieces from the hopper on the shelf and lifting the seated row of workpieces out of the hopper, each of the plurality of workpiece lift shelf assemblies pivotally attached to the rotating lift assembly for releasing the seated row of workpieces from each of the workpiece lift shelf assemblies as each of the workpiece lift shelf assemblies rotates over the apex of the workpiece lift assembly;
    a sorter for receiving the released row of workpieces, the sorter comprising:
        an arrival plate area for receiving the released row of workpieces; and
        a departure plate area, the arrival plate area separated from the departure plate area by a lift bar and a stop bar, the lift bar controllably rising to lift the released row of workpieces from the arrival plate area over the stop bar to the departure plate area;
    a first sensor to sense the presence of the released row of workpieces adjacent to the lift bar in the arrival plate area;
    a first drive mechanism to lower the lift bar responsive to the released row of workpieces adjacent to the lift bar to move the released row of workpieces on top of the lift bar;
    a second sensor to sense the presence of the released row of workpieces on top of the lift bar, the first drive mechanism to raise the lift bar so that the released row of workpieces on top of the lift bar move to the departure plate area and onto an exit conveyor adjacent to the departure plate area; and
    a disoriented workpiece rejection mechanism for removing disoriented workpieces from the exit conveyor.

* * * * *